May 22, 1956     O. L. BEBER ET AL     2,746,561
METHOD AND APPARATUS FOR CLEANING FILTERS IN
VAPOR SYSTEMS OF CATALYTIC REACTIONS
Filed Dec. 28, 1953
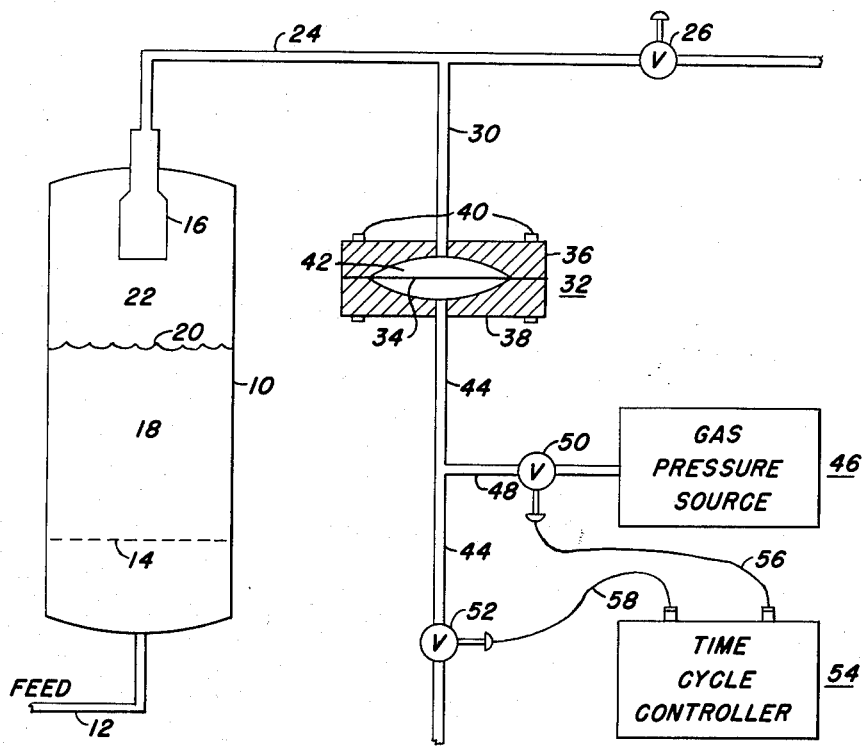
INVENTORS.
BY ORAL L. BEBER
BYRON B. WOERTZ
ATTORNEY.

United States Patent Office 2,746,561
Patented May 22, 1956

2,746,561

METHOD AND APPARATUS FOR CLEANING FILTERS IN VAPOR SYSTEMS OF CATALYTIC REACTIONS

Oral L. Beber, Lakewood, and Byron B. Woertz, Crystal Lake, Ill., assignors to The Pure Oil Company, Chicago, Ill., a corporation of Ohio Application December 28, 1953, Serial No. 400,742

2 Claims. (Cl. 183—61)

The present invention relates to a method and apparatus for removing occluded catalyst particles and fines from filters in vapor systems of catalytic reactions and, more particularly, to the removal of caked catalyst fines from catalyst filters by vibration of the filter screen through vibration of the gas or vapors emitting therefrom by use of a vibrating diaphragm or piston in the outlet from said filter.

In catalytic reactions whether static or fluid bed, it is common practice to provide a filter in the conduit leading from the reactor to remove catalyst fines from the reaction product vapors. Cyclone separators generally remove the major portion of catalyst particles for return to the reaction zone. However, there is generally present the problem of varying amounts of catalyst fines which are carried with the reaction products leaving the reaction zone despite the use of specially designed apparatus to prevent such carry-over. The amount of such catalyst fines carry-over may vary with different reactions and reactor designs. Numerous filters are available to remove these last small amounts of catalyst from the reaction products or treated vapors or gases. These filters are of different design and generally depend on the passage of the stream of reaction products through a confining zone containing a wire mesh or screen having very small openings or presenting a maze of interstices on which the catalyst fines are caught. In operation there is built up on the screen, a mat, bed or layer of catalyst fines which offers increased resistance to the flow of vapors through the filter. It becomes necessary to remove this accumulation of fines from time to time during the process in order to prevent pressure build-up in the reactor and other unwanted variations in reaction conditions. Devices exist which cause the vibration of the catalyst filter or screen to cause the removal of the accumulated catalyst fines. Such devices depend on mechanical connections and linkages extending within the reactor and are subject to extreme wear, mechanical failure, and are difficult to maintain.

In accordance with the present invention, the gases or vapors flowing through the catalyst filter are used to remove the bed of occluded catalyst fines in or on the filter by vibration of the outgoing gas stream itself through the use of an oscillating diaphragm or piston in a by-pass line communicating with the vapor or reaction product exit line from the catalyst filter.

Accordingly, it is an object of this invention to provide a method for conducting catalytic reactions wherein the catalyst fines are removed from the reaction products by means of a filter and the occluded catalyst fines are continuously or intermittently removed from the filter surfaces by vibration or oscillation of the vapor stream itself without the necessity of mechanical connections to within the reaction zone.

Another object of the invention is to provide an apparatus for vibrating the effluent vapor stream from a catalyst filter comprising a diaphragm or piston communicating with the effluent vapor stream and means for actuating the diaphragm or piston and controlling the frequency and duration of such actuation.

Other objects and advantages of the invention will become apparent as the description thereof proceeds.

The invention is best described in relation to the drawing, which is a diagrammatic representation of one form of apparatus suitable for carrying out the invention.

In the drawing, the reactor is represented by the numeral 10, having feed inlet 12, porous support 14 of sufficient porosity to allow entry of reactants and prevent the catalyst particles from leaving the fluid zone, and catalyst filter 16. The top of the fluidized reaction zone 18 is represented at 20. The upper part of reactor 10 would normally be fitted with a cyclone separator (not shown) for the purpose of separating and returning the major portion of the catalyst back to the fluidization zone prior to the entry of reaction products into the filter system. Filter 16 is fitted with any type of porous metallic sheet or ceramic material having a pore size of 1–40 microns. Porous stainless steel, Inconel, or Monel metal bayonet- or drum-type filters as manufactured by the Micro Metallic Corporation are suitable. Reaction products leave filter 16, pass through conduit 24, controlled by valve 26 into a suitable condenser (not shown). Conduit 30 connects from conduit 24 to pressure responsive means 32 in the form of a diaphragm 34 held between two flanges 36 and 38 by bolts 40 forming opening 42 for controlled movement of the diaphragm 34. Conduit 44 leads from the opposite side of the diaphragm 34 to a source of gas under pressure indicated at 46 conducted through conduit 48 and controlled by valve 50. Conduit 44 terminates at vent valve 52. A time cycle controller 54 is provided to control valves 50 and 52 through conduits or wires 56 and 58. Valves 50 and 52 may be operated (closed or opened) by either electricity or compressed air. Source 46 may be a compressed air tank or compressor. Time cycle controller may be any device adapted to give off one or more signals at predetermined timed cycles. For example, a motor-driven time control instrument having two pairs of setting levers, one having certain time limit settings between "off" and "on" and the other having certain time limit settings between "on" and "off," could be used. Such an instrument could operate on 35 amperes, 115 volts, 60-cycle current, and may have one or more poles and single or double throw. Instruments of this type are also designed to operate in 15 to 30 minute steps with specified adjustable intervals between operations. Sangamo time switches, type "L" or type "S," may be used for this purpose to operate electrically actuated valves. Also the Paragon time switch, models 331–334, designed for continuous commercial operation normally used to control lighting of store windows, off-peak water heating, electrical signs, and traffic controls may be used. For air pressure operated valves, the Fisher time cycle regulator, series 4500, described in their bulletin 4500, is recommended for any application where it is desired to automatically open and close a valve in accordance with a predetermined time schedule. Such instruments have a clock timing mechanism and system of trigger valves and multiple-way valves which actuate one or more motor valves or pressure operated valves at desired time intervals.

The operation of the device may be as follows: Time cycle control 54 is set to send a signal to electrically operated quick-opening valve 50 at a predetermined time interval of, say, once every 30 minutes under the conditions of catalyst accumulation in filter 16. The controller is also set to send a second signal to valve 52 a few seconds later. Thus, at each 30-minute interval controller 54 opens valve 50 allowing compressed air at a pressure slightly higher than reaction pressure to push diaphragm 34 as far as it will go within the protecting confines of opening 42. This places a momentary back pressure through line 30 into line 24 and back into filter 16. Following this, controller 54 closes valve 50 and opens valve 52 until the pressures on each side of diaphragm 34 are at equilibrium again; then valve 52 is closed and diaphragm 34 reaches its bottom position. Controller 54 may be set to open and close successively valves 50 and 52 two or more times every 30-minute interval in order to impart to diaphragm 34 and the exit reaction products two or more successive vibrations to insure that the catalyst has been freed from the face of the filter. If air-operated valves are used, the same sequence of events can be caused to occur. In normal operation, control valve 26 need not be disturbed during the cleaning cycle and flow of reactants is practically uninterrupted.

Generally, one oscillation of the diaphragm imparting its back pressure through line 24 into the filter in a given cycle is sufficient to free the catalyst cake in filter 16 and cause it to fall back into the reaction zone. If desired, source 46 may be a pulsating air pressure so that at any one interval of time in which valve 50 is opened by control 54, diaphragm 34 may be moved in an oscillating manner against the reaction pressure in line 24.

By adjustment of the pressure differential between source 46 and the reactor, the magnitude of oscillation of diaphragm 34 within means 32 can be controlled to a desired value. The differential pressure between the gas pressure source and the reaction zone may be between about 5 to 15 pounds per square inch. The apparatus is designed to constantly prevent the undesirable increases in pressure drops through the catalyst filter and in this connection the time cycle controller can be actuated by or receive a signal from a pressure gauge (not shown) located in line 24 to indicate the magnitude of the pressure drop and initiate a signal to the time cycle controller. Time cycle controller 54 may be fully automatic and caused to operate at definite time intervals as once every 30 minutes with gradual decrease or increase of the interval as the tendency for accumulation of catalyst fines increases or decreases with changing reaction conditions or changes in particle form of the catalyst.

Although the invention has been described by reference to specific embodiments, it is understood that other suitable means may be used to accomplish the results obtained. For example, a piston or bellows may be substituted for the diaphragm 34. However, it has been found that the arrangement shown in the drawings is preferred since the response to pressure changes is greater and the degree of vibration obtained is more effective. The only limitations attaching to the invention appear in the appended claims.

What is claimed is:

1. An apparatus for removing catalyst fines from a catalyst filter located between the outlet of a catalytic reaction zone and the conduit for conducting gaseous reaction products from said zone comprising in combination, a source of gas pressure, a pressure responsive means connected between said source of gas pressure and said outlet conduit, said gas pressure source being maintained at a pressure higher than the pressure within said reaction zone, said pressure responsive means adapted to translate pressure increases from the gas pressure side thereof to the outlet conduit side thereof, means for controlling the passage of gas pressure to said pressure responsive means, means for releasing the gas pressure from said pressure responsive means, and a time control means connected to said control and release means to alternately and intermittently open and close said control means and close and open said release means, thereby to cause said pressure responsive means to oscillate and impart a vibratory action to said reaction products and free said filter of occluded catalyst particles.

2. An apparatus in accordance with claim 1 in which the pressure responsive means comprises a flexible impermeable diaphragm placed with one side thereof in communication with said outlet conduit and the other side thereof in communication with said gas pressure source, and said time control means is a time cycle controller.

References Cited in the file of this patent

UNITED STATES PATENTS

| 2,276,805 | Tolman | Mar. 17, 1942 |
| 2,526,651 | Garbo | Oct. 24, 1950 |

FOREIGN PATENTS

| 53,913 | Austria | June 10, 1912 |
| 393,670 | Germany | Apr. 5, 1924 |